US012769465B2

(12) United States Patent
Cariello

(10) Patent No.: US 12,769,465 B2
(45) **Date of Patent: *Oct. 20, 2026**

(54) DISTRIBUTED POWER UP FOR A MEMORY SYSTEM

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/013,982

(22) Filed: Jan. 8, 2025

(65) Prior Publication Data

US 2025/0224889 A1 Jul. 10, 2025

Related U.S. Application Data

(63) Continuation of application No. 17/737,539, filed on May 5, 2022, now Pat. No. 12,223,184.

(51) Int. Cl.
*G06F 3/06* (2006.01)

(52) U.S. Cl.
CPC .......... *G06F 3/0625* (2013.01); *G06F 3/0655* (2013.01); *G06F 3/0679* (2013.01)

(58) Field of Classification Search
CPC .... G06F 3/0625; G06F 3/0655; G06F 3/0679; G06F 3/0619; G06F 3/0632; G06F 3/0688
See application file for complete search history.

(56) References Cited

U.S. PATENT DOCUMENTS

| | | | | |
|---|---|---|---|---|
| 2006/0053273 | A1 | 3/2006 | Chu et al. | |
| 2008/0294951 | A1 | 11/2008 | Ahmad et al. | |
| 2010/0115180 | A1 | 5/2010 | Lee et al. | |
| 2018/0336091 | A1 | 11/2018 | Minzoni | |
| 2020/0066364 | A1 * | 2/2020 | Liikanen ................ | G11C 29/52 |

* cited by examiner

*Primary Examiner* — Kalpit Parikh
(74) *Attorney, Agent, or Firm* — Holland & Hart LLP

(57) ABSTRACT

Methods, systems, and devices for distributed power up for a memory system are described. The method may include a memory system receiving, from a host system, a command to initialize a set of memory devices included in a memory system. Upon receiving the command, the memory system may select a first memory device from the set of memory devices and read, from a second memory device in a controller separate from the set of memory devices, a first operational parameter corresponding to the first memory device. The memory system may then read, from the first memory device, a set of second operational parameters, each second operational parameter of the set of second operational parameters corresponding to a respective memory device of the set of memory devices.

20 Claims, 6 Drawing Sheets

DISTRIBUTED POWER UP FOR A MEMORY SYSTEM

CROSS REFERENCE

The present Application for Patent is a continuation of U.S. patent application Ser. No. 17/737,539 by Cariello, entitled "DISTRIBUTED POWER UP FOR A MEMORY SYSTEM," filed May 5, 2022, assigned to the assignee hereof, and is expressly incorporated by reference in its entirety herein.

FIELD OF TECHNOLOGY

The following relates to one or more systems for memory, including distributed power up for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
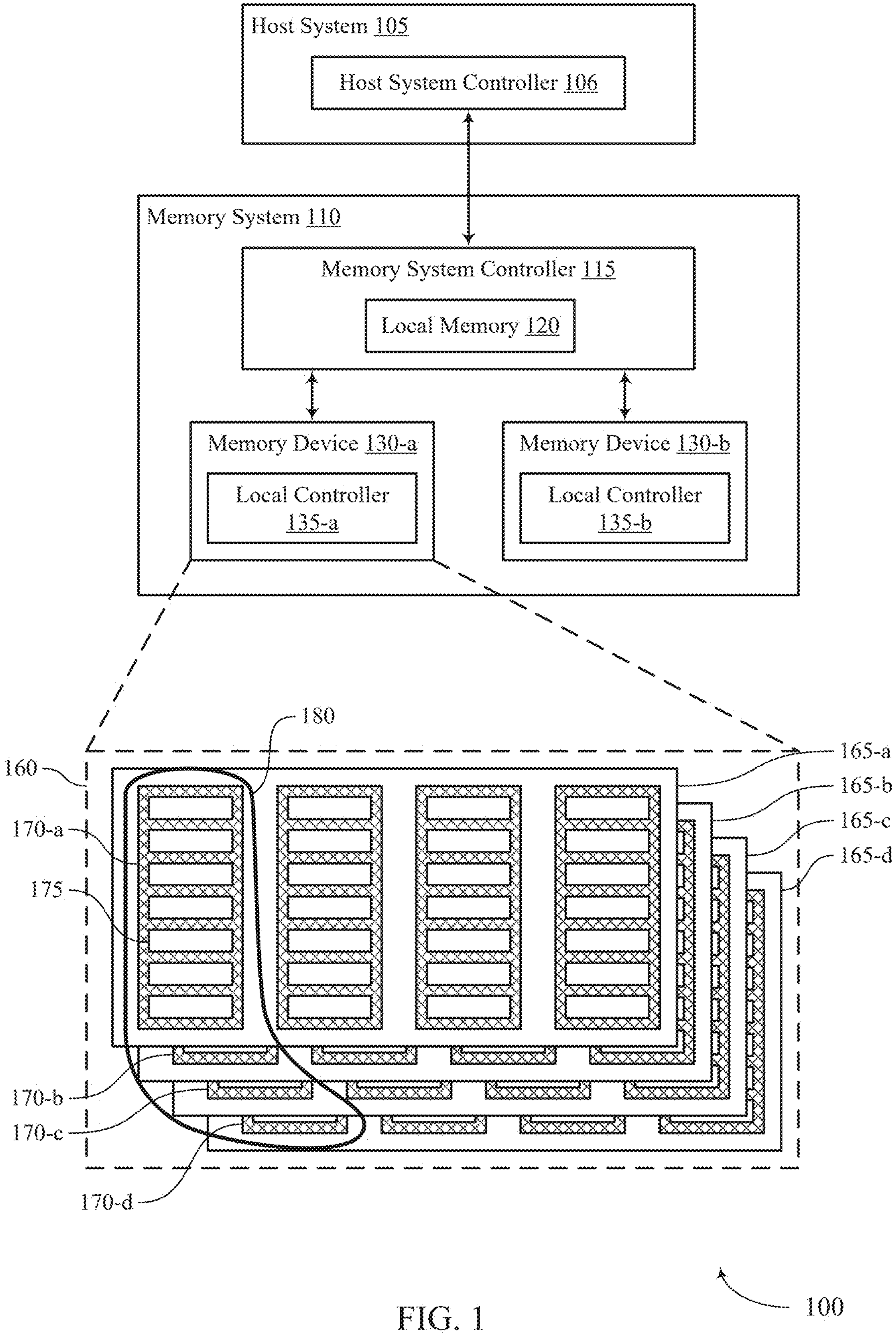
FIGS. 1 and 2 illustrate examples of a system that supports distributed power up for a memory system in accordance with examples as disclosed herein.

In some examples, during initialization of a memory system, all memory devices of the memory system may be initialized. To begin initialization, a memory system controller may send an initialization command to one or more memory devices of the memory system. To initialize a memory device of the one or more memory devices, an array controller (e.g., a controller located at the memory device) may read one or more parameters, such as a trim set having one or more trims, from a memory block (e.g., one time programmable (OTP) block) located at the memory system. A trim set may be described as one or more parameters, such as one or more voltage parameters, that the memory device may use for subsequent access operations and may be loaded into a corresponding latch of the memory device after being read.

In some examples, during initialization, the memory system may initialize one memory device and initialize the remaining memory devices from the selected memory device. For example, the memory system may select a memory device from a set of memory devices at the memory system. After initializing the selected memory device, a memory system controller (e.g., a controller external to the set of memory devices) may initialize the remaining memory devices of the set by reading trim sets corresponding to the remaining memory devices of the set from the selected memory device. In some examples, however, the selected memory device may be set. That is, for each initialization procedure, the memory system may select the same memory device. As such, the array controller may perform a read operation on a same portion of the memory block for each initialization procedure. Performing numerous read operations on the same portion of the memory block may result in a read disturb on the memory block and cause the initialization procedure to fail. Additionally, the affected portion of the memory block, may not be refreshed because an error during the refresh procedure (e.g., a power loss) may cause next initialization to fail and brick the memory device and consequently making the whole memory system unusable.

As described herein, the memory system may select a memory device (e.g., may randomly select) to initialize at the start of the initialization procedure instead of always selecting a same memory device. This may allow for selecting of different memory devices at different initialization times instead of always selecting a same memory device. The memory system may receive a command from the host system to initialize one or more memory devices of the memory system. Based on or in response to receiving the command, the memory system may determine a quantity of the one or more memory devices. Additionally, the memory system may determine or assign an identifier to at least some of, if not each of, the memory devices. The memory system may then select (e.g., may randomly select) a memory device from the set of memory devices. In some examples, the memory system may randomly select the memory device using a random number generator. That is, the memory device may input the identifiers of the memory device into the random number generator and select the memory device whose identifier is output from the random number generator.

Upon selecting the memory device, a controller (e.g., an array controller) may read the trim set (e.g., one or more trims) from the memory device and load the trim set into one or more latches of the selected memory device. The memory system controller may then read trim sets corresponding to the remaining memory devices from the selected memory device and load the trim sets into corresponding registers of the remaining memory devices. Unlike the array controller, the memory system controller may include circuitry that may enable the memory system controller to read the trim sets more efficiently and reliably. For example, the memory system controller may include error correcting code (ECC) circuitry that may allow the memory system controller to correct errors present in trim sets read from a memory device. Randomly selecting the memory device at the start of initialization may allow the memory system to read different portions of the memory device at the memory system controller during each initialization procedure, which will more evenly distribute wear out and increase the life span of the memory device, among other advantages.

Figure 2:
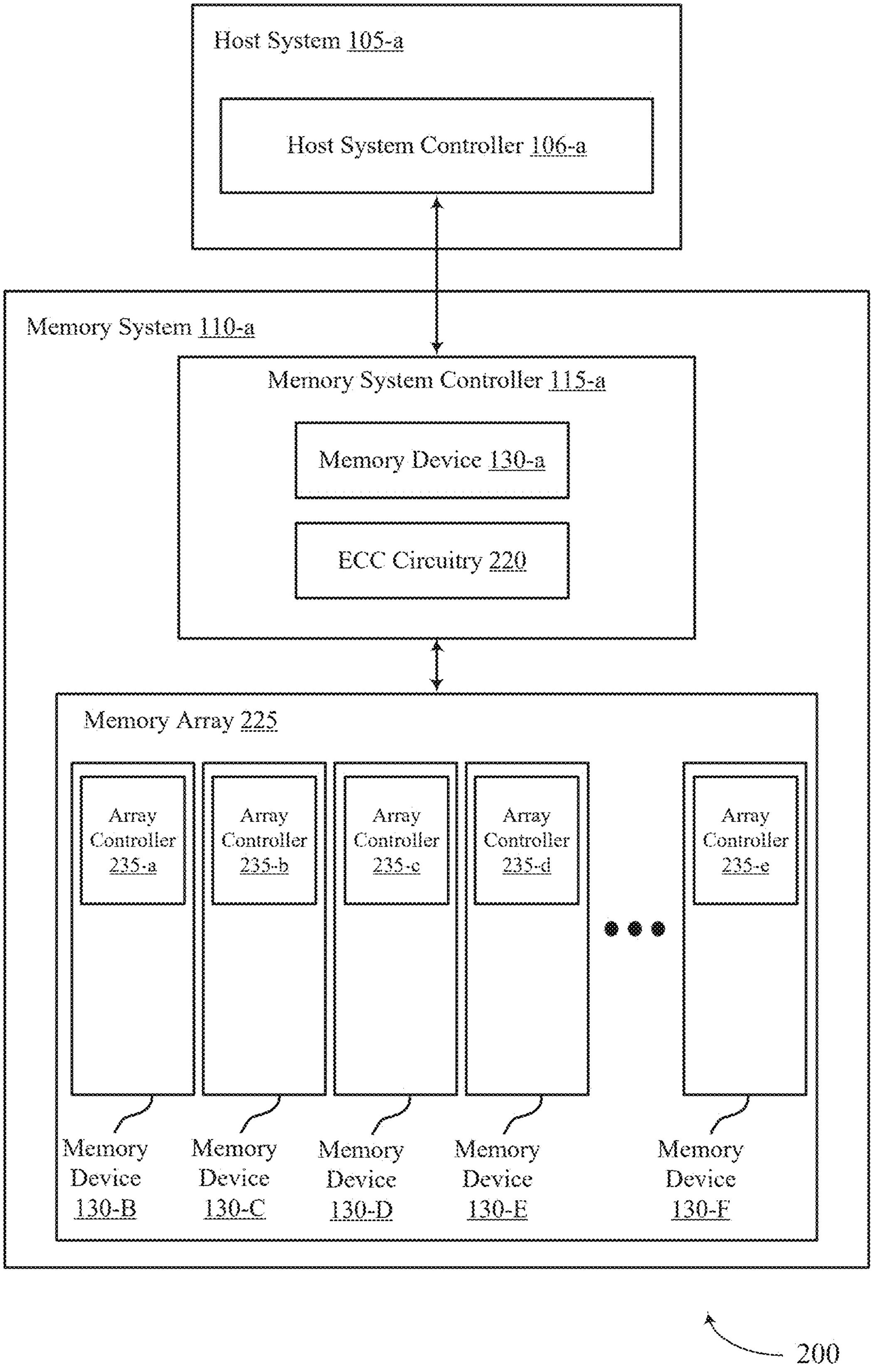

Features of the disclosure are initially described in the context of systems with reference to FIGS. 1 and 2. Features of the disclosure are described in the context of flow diagrams with reference to FIG. 3. These and other features of the disclosure are further illustrated by and described in the context of an apparatus diagram and flowchart that relate to distributed power up for a memory system with reference to FIGS. 4-6.

FIG. 1 illustrates an example of a system 100 that supports distributed power up for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support distributed power up for a memory system. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

As described herein, a memory system 110 may randomly select one or more memory devices 130 at the start of an initialization procedure. In some examples, the memory system 110 may undergo an initialization procedure when booting up after being powered down. To initiate the initialization procedure, the host system 105 may transmit a command to the memory system 110 instructing the memory system 110 to initialize a set of memory devices 130 of the memory system 110. Initializing the set of memory devices 130 of the memory system 110 may include loading trim sets (e.g., voltage parameters) associated with respective memory devices 130 into corresponding latches of the respective memory devices 130. The trim sets for the memory devices 130 of the set may be stored at the local memory 120. Additionally, during manufacturer the trim sets may be read and copied to the memory devices 130 of the set. As such, the trim sets may be stored at the memory devices 130 of the set.

To initialize the memory devices 130 of the set, the memory system 110 may select one or more memory devices 130 of the set. In some examples, the memory system 110 may randomly select the memory device 130 from the set of memory devices 130. As one example, the memory system 110 may utilize a random number generator (e.g., a true random number generator, a pseudo random number generator) to select the memory device 130. After selecting the memory device 130, the memory system 110 may initialize the selected memory device 130. That is, the local controller 135 may read a trim set corresponding to the selected memory device 130 from the local memory 120 and load the trim sets into one or more latches of the selected memory device 130. Upon initializing the selected memory device 130, the memory system 110 may initialize the remaining memory devices 130 of the set. To initialize the remaining memory devices 130, the memory system controller 115 may read the trim sets corresponding to the remaining memory devices 130 and load the trims sets in respective registers of the remaining memory devices 130.

FIG. 2 illustrates an example of a system 200 that supports distributed power up for a memory system in accordance with examples as disclosed herein. In some examples, the system 200 may implement aspects of a system 100. For example, the system 200 may include a host system 105-*a*, a host system controller 106-*a*, a memory system 110-*a*, a memory system controller 115-*a*, and memory devices 130 which may be examples of a host system 105, a host system controller 106, a memory system 110, memory system controller 115, and a memory device 130 as described in FIG. 1. Moreover, the system 200 may include a memory device 130-*a* which may be an example of a local memory 120 as described in FIG. 1.

In some examples, the host system 105-*a* may include a host system controller 106-*a* and the memory system 110 may include a memory system controller 115-*a*. The host system controller 106-*a* may be in electronic communication with the memory system controller 115-*a*. As such, the host system 105-*a* may transmit commands to the memory system 110 via the memory system controller 115-*a*. Moreover, the memory system controller 115-*a* may be in electronic communication with the memory array 225, but may be located separate from the memory array 225. The memory system controller 115-*a* may include ECC circuitry 220 and a memory device 130-*a* (e.g., OTP block). The ECC circuitry 220 may allow for the memory system controller 115-*a* to correct or detect errors associated with reading or writing data. In some examples, the memory device 130-*a* may store trim sets corresponding to each of the memory devices 130 of the memory array 225 (e.g., the memory device 130-*b*, the memory devices 130-*c*, the memory device 130-*d*, the memory device 130-*e*, and the memory device 130-*f*).

Moreover, each memory devices 130 may include its own controller. For example, the memory device 130-*b*, the memory device 130-*c*, the memory device 130-*d*, the memory device 130-*e*, and the memory device 130-*f* may include an array controller 235-*a*, an array controller 235-*b*, an array controller 235-*c*, an array controller 235-*d*, and an array controller 235-*e*, respectfully. Each array controller 235 may be in electronic communication with its respective memory device 130 of the memory array 225. In some examples, the memory device 130 of the memory array 225 may store the trim sets corresponding to the memory devices 130 of the memory array 225. That is, during manufacturing the trim set may be copied to the memory device 130 of the memory array 225.

In some examples, to save power, the host system 105-*a* may transmit a command to the memory system 110 to shut down or power off for a duration. For example, the host system 105-*a* may transmit a sleep command to the memory system 110. After the duration, the memory system 110-*a* may boot up or power on. At each power up, the memory system 110 may undergo an initialization procedure. That is, the memory system 110 may initialize all of the memory devices 130 of the memory array 225. Initializing a memory device 130 may include loading a trim set into one or more latches of the memory device 130. The trim set may be an example of voltage parameters that ensure proper reading and writing of the memory device 130.

In some examples, upon receiving a command to commence the initialization procedure, the memory system 110 may select one or more memory devices 130 of the memory array 225. In one example, the memory system 110-*a* may determine a quantity of memory devices 130 included in the memory array 225 and assign each of the memory devices 130 of the memory array 225 with an index. For example, the memory system 110 may assign the memory device 130-*b*, the memory device 130-*c*, the memory device 130-*d*, the memory device 130-*e*, and the memory device 130-*f* an index of 0, 1, 2, 3, 4, and 5, respectively. To randomly select the one or more memory devices 130, the memory system 110 may input the indices of the memory devices 130 into a random number generator and select one or more memory devices 130 whose indices are output from the random number generator. As one example, the output of the random number generator may be 2 and as such, the memory system may select the memory device 130-*d*. Upon selecting the memory device 130, the array controller 235-*c* (e.g., of the memory device 130-*d*) may read a trim set associated with the memory device 130-*d* from the memory device 130-*a* (e.g., OTP block) and load the trim set into latches of the memory device 130-*d*. In some examples, the memory system 110 may determine whether the memory device 130-*d* was successfully or unsuccessfully initialized.

In the case that the memory device 130-*d* was not initialized successfully, the memory system 110 may randomly select a different memory device 130 of the memory array 225 (e.g., using the random number generator). As one example, the memory system 110 may select a memory device 130-*c*. Similar to the memory device 130-*d*, upon selecting the memory device 130-*c*, the array controller 235-*b* (e.g., of the memory device 130-*c*) may read a trim set associated with the memory device 130-*c* from the memory device 130-*a* and load the trim set into latches of the memory device 130-*c*. Moreover, the memory system 110 may determine whether the memory device 130-*c* was initialized successfully or unsuccessfully. In some examples, the memory system 110 may record the results of the initialization of the one or more memory devices 130 in a register. For example, if the memory device 130-*d* did not initialize successfully and the memory device 130-*c* initialized successfully, the memory system 110 may record an unsuccessful result for the memory device 130-*d* and a successful result for the memory device 130-*c* in the register.

Upon initializing the selected one or more memory devices 130, the memory system 110 may initialize the remaining memory devices 130 of the memory array 225 (e.g., the memory device 130-*b*, the memory device 130-*e*, and the memory device 130-*f*). In some example, the memory system controller 115-*a* may read the trim sets associated with each respective remaining memory device 130 from one of the one or more selected memory devices 130 (e.g., the memory device 130-*e* or the memory device 130-*f*) and load the trim sets into respective latches. In some examples, the memory system 110 may utilize turbo initialization commands to initialize the remaining memory devices 130. The turbo initialization commands may enable the memory system controller 115-*a* and the remaining memory devices 130 to cooperate in the trim loading procedure by skipping or altering the standard initialization procedure. That is, using the turbo initialization commands, the memory system controller 115-*a* may read the trim sets associated with each respective remaining memory devices 130 from one of the one or more selected memory devices 130 (e.g., the memory device 130-*e* or the memory device 130-*f*) and load the trim sets into respective latches. In addition, the memory system controller 115-*a* may implement ECC circuitry 220 during the trim loading procedure. For example, using the ECC circuitry 220, the memory system controller 115-*a* may detect or correct errors associated with reading the trim sets.

In some example, after initializing the remaining memory devices 130, the memory system 110 may check the register storing the result of the initialization procedure performed on the selected one or more memory devices 130. If the register stores an unsuccessful result for at least one of the one or more selected memory devices 130 (e.g., the memory device 130-*c* and the memory device 130-*d*), the memory system 110 may reread the trim set associated with the at least one of the one or more selected memory devices 130 using the turbo initialization commands. That is, the memory system controller 115-*a* may read the trim sets associated with at least one of the one or more selected memory devices 130 and load the trim sets into the respective latches. After initializing the memory devices 130 of the memory array 225, the host system controller 106-*a* may access (e.g., read or write) the memory device 130 of the memory array 225. Using the method as described herein may allow the memory system 110 to randomly select a memory device 130 at the start of the initialization procedure which may reduce read disturb on the memory device 130-*a*.

Figure 3:
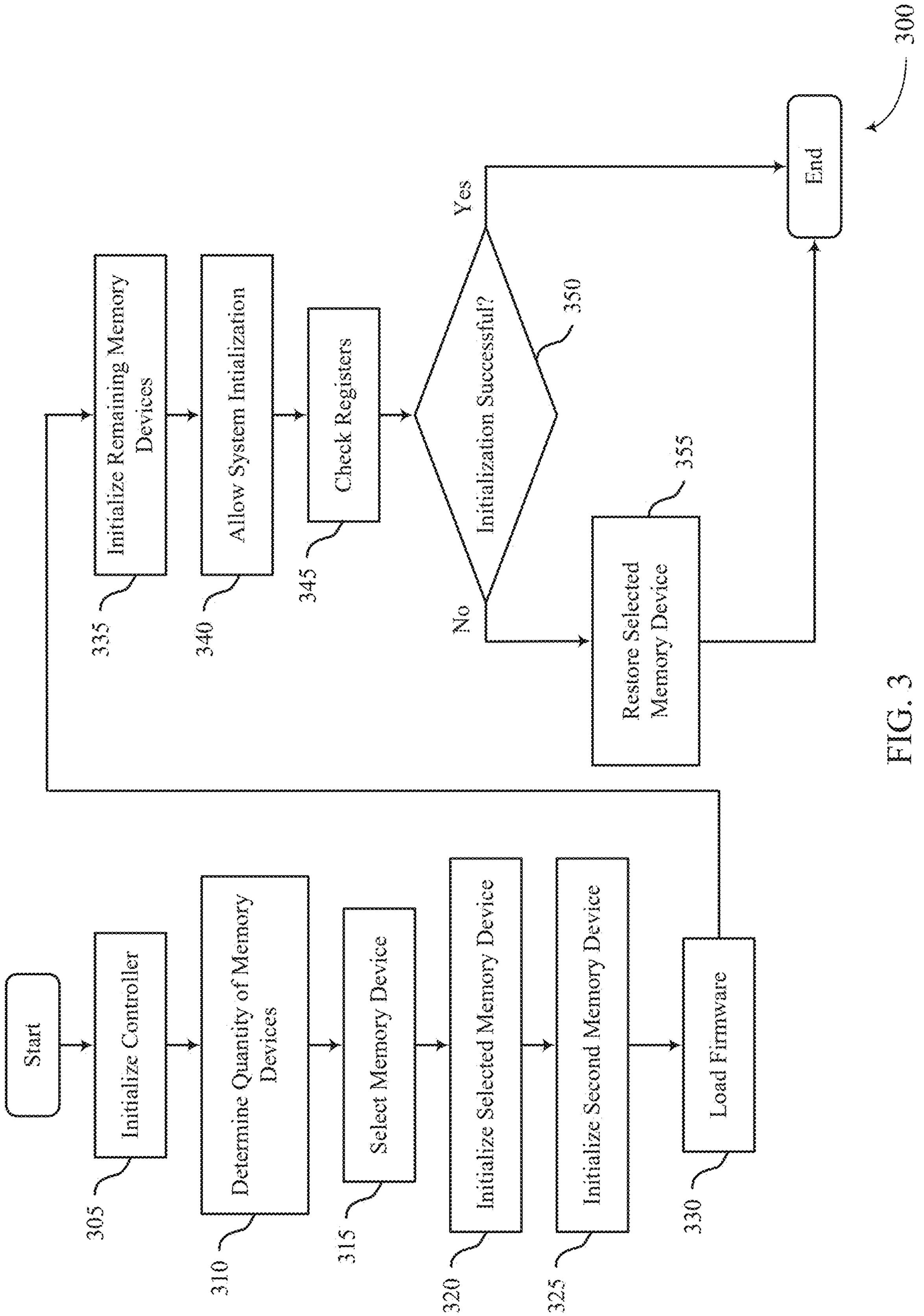
FIG. 3 illustrates an example of a flow diagram that supports distributed power up for a memory system in accordance with examples as disclosed herein.

FIG. 3 illustrates an example of a flow diagram 300 that supports distributed power up for a memory system in accordance with examples as disclosed herein. In some examples, the flow diagram 300 may be implemented by aspects of a system 100 and a system 200. For example, the flow diagram 300 may be implemented by a host system 105, a host system controller 106, a memory system 110, memory system controller 115, or a memory device 130 as described with reference to FIGS. 1 and 2. In some cases, alternative examples of the following may be implemented, where some operations may be performed in a different order than described or are not performed at all. Additionally or alternatively, operations may include additional features not mentioned below, or further processes may be added.

At 305, the controller may be initialized. In some examples, a host system may initialize the controller and the controller may be an example of a memory system controller that is separate from a set of memory devices located at a memory array portion of a memory system. Moreover, the controller may include a second memory device (e.g., an OTP block, a ROM block). In some examples, the set of memory devices and the second memory device may store a set of operational parameters, where each operational parameter of the set corresponds to a respective first memory device of the set. An example of an operational parameter may be a voltage parameter or a trim set.

At 310, a quantity of the set of memory devices may be read. In some examples, the controller may read the quantity of the set of memory devices from a set of fuses (e.g., eFuses). In some examples, upon determining the quantity of set of the memory devices, the controller may assign an identifier to each of the memory devices of the set.

At 315, a first memory device of the set of memory devices may be selected. In some examples, the controller may select the first memory device using an output of a random number generator. For example, the controller may input the identifiers into the random number generator and select the memory device whose identifier is output from the random number generator (e.g., the first memory device). In some examples, the controller may select more than one memory device from the set of memory devices. For example, the controller may select a first memory device from the set of the memory devices as well as a third memory device from the set of memory devices. The random number generator may include one of a true random number generator or a pseudo random number generator.

At 320, the selected first memory device may be initialized. In some examples, a second controller (e.g., a controller located in the first memory device) may initialize the first memory device. Initializing the first memory device may include the second controller reading, from the second memory device, a first operational parameter from the set of operational parameters corresponding to the first memory device. In some examples, the controller or the second controller may determine whether a first result associated with reading the first operational parameter is a successful result or a failed result. The controller or the second controller may store the first result in one or more registers.

At 325, the selected third memory device may potentially be initialized. In some example, a second controller (e.g., a controller located in the third memory device) may initialize the third memory device if the first result includes a failed result. In another example, the second controller may initialize the third memory at the same time or during a same time duration as the first memory is initialized. Initialing the third memory device may include the second controller reading, from the second memory device, a second operational parameter from the set of operational parameters corresponding to the second memory device. In some examples, the controller or the second controller may determine whether a second result associated with reading the second operational parameter is a successful result or a failed result. The controller or the second controller may store the second result in the one or more registers. In some examples, if the second controller initializes more than one memory device, the second controller or the controller may select the memory device that is associated with a successful result. For example, if the first memory device fails to initialize and the third memory device succeeds in initializing, the second controller or the controller may select the third memory device.

At 330, the firmware may be loaded. In some examples, the firmware may include instructions for an initialization procedure for the remaining memory devices of the set of memory devices. In some examples, the memory system may utilize turbo initialization command for the initialization procedure. In such example, the firmware may include define a set of commands that allow the controller and the set of memory device to cooperate in the initialization procedure or allow the controller to read the operational parameters using complex circuitry (e.g., ECC circuitry). In some examples, the firmware may inspect the one or more registers to determine which memory devices have been initialized and which memory devices have not been initialized.

At 335, the remaining memory devices of the set may be initialized. In some examples, the controller may initialize the remaining memory devices. Initializing the remaining may include the controller reading, from the selected memory device (e.g., the first memory device or the third memory device if the first memory device failed), operational parameters from the set of operational parameters corresponding to respective memory devices of the remaining memory devices.

At 340, the host system may be potentially initialized. Initializing the host system may include informing the host system that the memory array or a storage of the memory system is waking up.

At 345, the one or more register may be checked. In some examples, the controller may check the one or more registers.

At 350, it may determine whether the results stored in the one or more registers are successful results. If the results stored in the one or more registers are successful results, the initialization may be complete. If the results stored in the one or more registers include at least one failed result, the controller may attempt to re-initialize the memory device associated with at least one failed result. As one example, the first result associated with the first memory device may be associated with a failed result. In such example, the controller may read the first operational parameter from the second memory device. In some example, the first memory device may be associated with a failed result because of errors present in data read from the second memory device. As opposed to the second controller, the controller may include ECC circuitry which may allow the controller to correct the errors and successfully initialize the first memory device. Using the methods as described herein, a memory system will be able to randomly select memory devices from a memory array of the memory system at the start of the initialization procedure which may reduce the number of read cycles performed on memory device local to the controller (e.g., the memory system controller). In addition, the use of turbo initialization commands (as merely one example among other commands) allows the memory system to load trims for the remaining memory devices of the memory system in a more efficient and reliable way.

Figure 4:
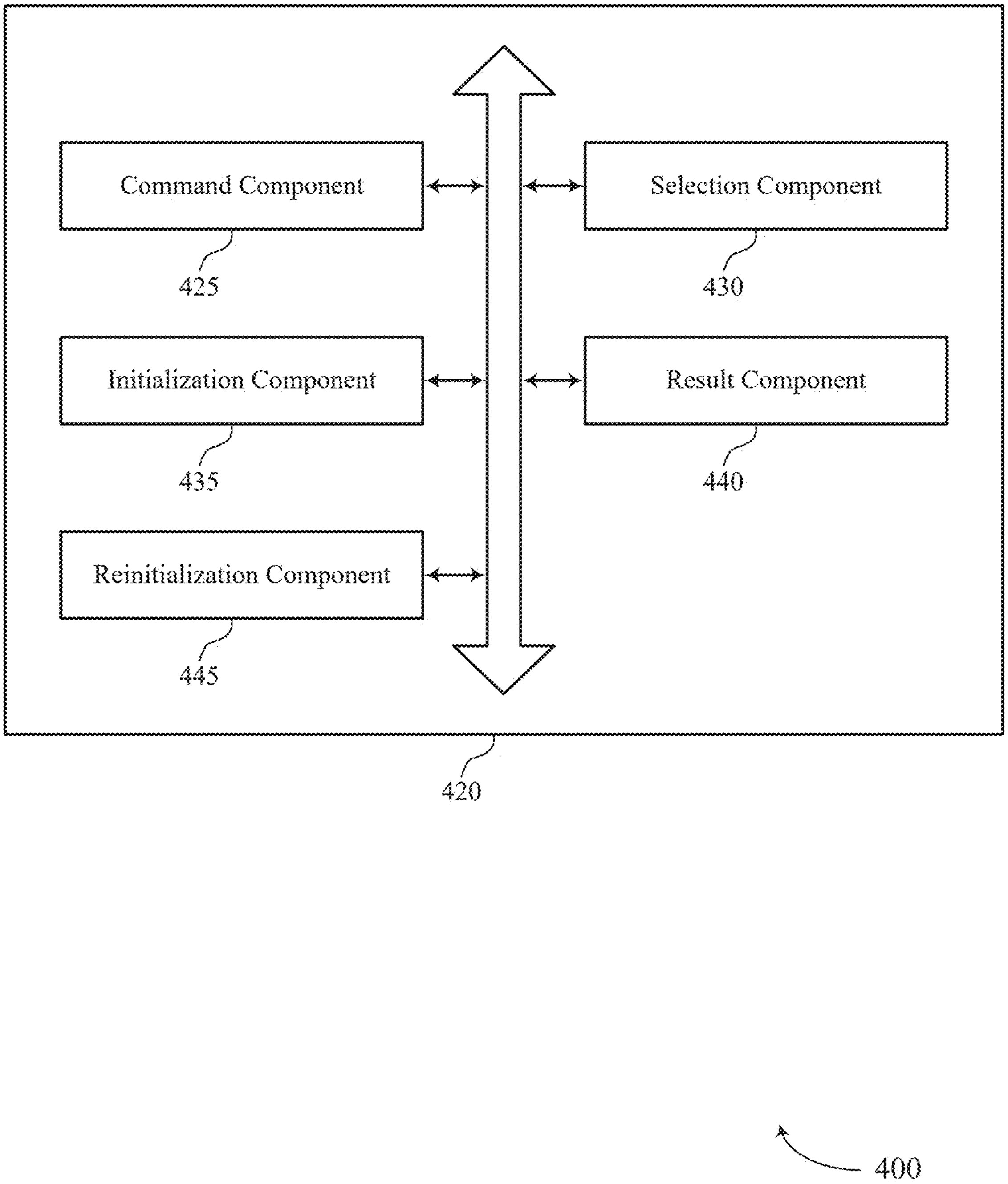
FIG. 4 shows a block diagram of a memory system that supports distributed power up for a memory system in accordance with examples as disclosed herein.

FIG. 4 shows a block diagram 400 of a memory system 420 that supports distributed power up for a memory system in accordance with examples as disclosed herein. The memory system 420 may be an example of aspects of a memory system as described with reference to FIGS. 1 through 3. The memory system 420, or various components thereof, may be an example of means for performing various aspects of distributed power up for a memory system as described herein. For example, the memory system 420 may include a command component 425, a selection component 430, an initialization component 435, a result component 440, a reinitialization component 445, or any combination thereof. Each of these components may communicate, directly or indirectly, with one another (e.g., via one or more buses).

The command component 425 may be configured as or otherwise support a means for receiving, from a host system, a command to initialize a plurality of memory devices included in a memory system. The selection component 430 may be configured as or otherwise support a means for selecting a first memory device from the plurality of memory devices based at least in part on the command. The initialization component 435 may be configured as or otherwise support a means for reading, from a second memory device in a controller separate from the plurality of memory devices, a first operational parameter corresponding to the first memory device. In some examples, the initialization component 435 may be configured as or otherwise support a means for reading, from the first memory device, a set of second operational parameters, each second operational parameter of the set of second operational parameters corresponding to a respective memory device of the plurality of memory devices.

In some examples, to support selecting the first memory device, the selection component 430 may be configured as or otherwise support a means for selecting the first memory device using an output of a random number generator. In some examples, the random number generator includes one of a true random number generator or a pseudo random number generator.

In some examples, the selection component 430 may be configured as or otherwise support a means for selecting a third memory device from the plurality of memory devices based at least in part on the command.

In some examples, the result component 440 may be configured as or otherwise support a means for determining whether a first result associated with reading the first operational parameter is a successful result or a failed result. In some examples, the result component 440 may be configured as or otherwise support a means for determining whether a second result associated with reading, from the second memory device, a third operational parameter corresponding to the third memory device is the successful result or the failed result, where selecting the first memory device is based at least in part on determining the first result and the second result.

In some examples, determining whether the first result associated with reading the first operational parameter is the successful result or the failed result includes determining that the first result associated with reading the first operational parameter is the successful result. In some examples, determining whether the second result associated with reading the third operational parameter is the successful result or the failed result includes determining that the second result associated with reading the third operational parameter is the failed result.

In some examples, the result component 440 may be configured as or otherwise support a means for storing the first result and the second result in one or more registers.

In some examples, the result component 440 may be configured as or otherwise support a means for determining, after reading the set of second operational parameters, that the second result includes the failed result. In some examples, the reinitialization component 445 may be configured as or otherwise support a means for reading, at the controller and from the second memory device, the third operational parameter based at least in part on determining that the second result includes a failed result. In some examples, the reinitialization component 445 may be configured as or otherwise support a means for storing the third operational parameter in a latch corresponding to the third memory device.

In some examples, to support reading the set of second operational parameters, the initialization component 435 may be configured as or otherwise support a means for reading, at the controller, the set of second operational parameters. In some examples, the controller includes error correcting code circuitry for detecting and correcting errors associated with reading operational parameters.

In some examples, the initialization component 435 may be configured as or otherwise support a means for storing each second operational parameter of the set of second operational parameters in a respective latch corresponding to the respective memory device of the plurality of memory devices.

In some examples, the selection component 430 may be configured as or otherwise support a means for selecting the second memory device based at least in part on the command. In some examples, the first operational parameter and the set of second operational parameters include voltage parameters. In some examples, the first operational parameter and the set of second operational parameters include trims.

Figure 5:
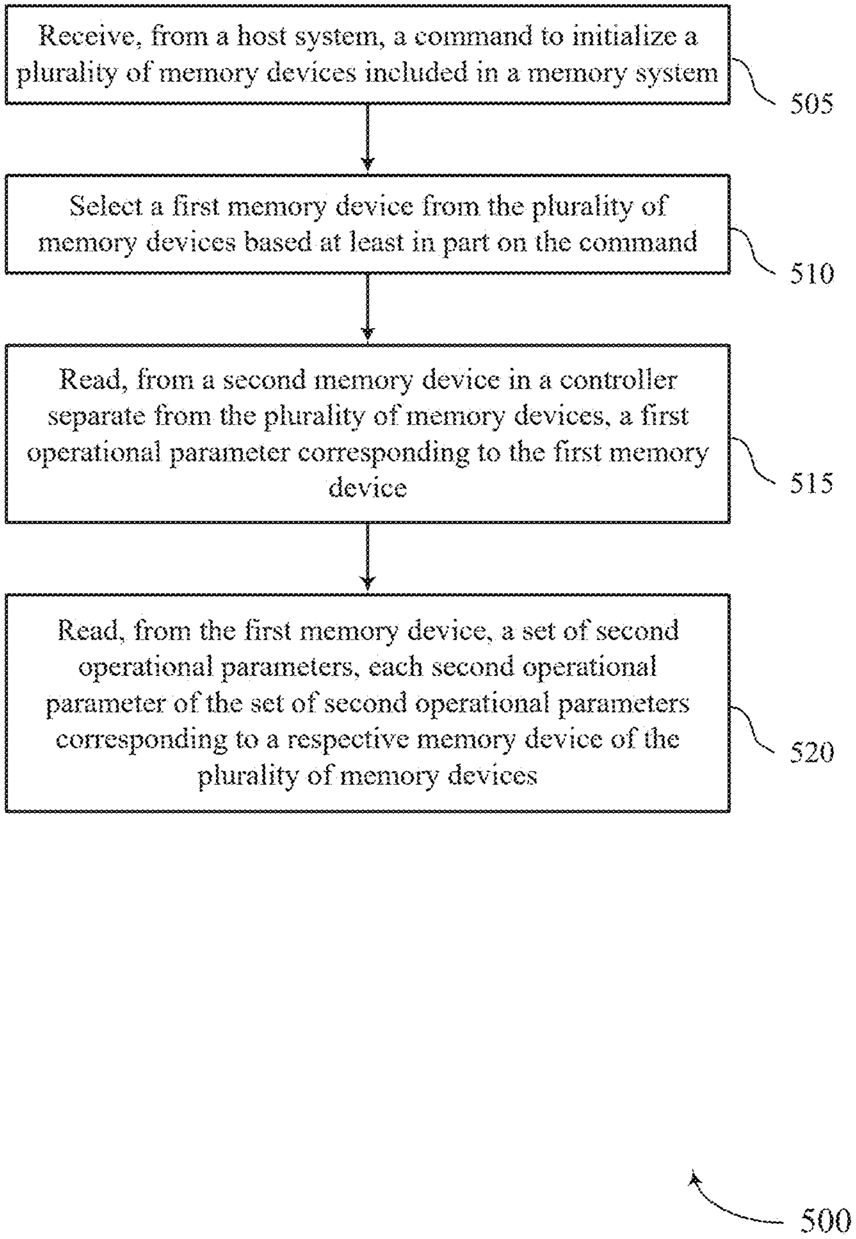
FIGS. 5 and 6 show flowcharts illustrating a method or methods that support distributed power up for a memory system in accordance with examples as disclosed herein.

FIG. 5 shows a flowchart illustrating a method 500 that supports distributed power up for a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving, from a host system, a command to initialize a plurality of memory devices included in a memory system. The operations of 505 may be performed in accordance with examples as disclosed herein. In some examples, aspects of the operations of 505 may be performed by a command component 425 as described with reference to FIG. 4.

At 510, the method may include selecting a first memory device from the plurality of memory devices based at least in part on the command. The operations of 510 may be performed in accordance with examples as disclosed herein. In some examples, aspects of the operations of 510 may be performed by a selection component 430 as described with reference to FIG. 4.

At 515, the method may include reading, from a second memory device in a controller separate from the plurality of memory devices, a first operational parameter corresponding to the first memory device. The operations of 515 may be performed in accordance with examples as disclosed herein. In some examples, aspects of the operations of 515 may be performed by an initialization component 435 as described with reference to FIG. 4.

At 520, the method may include reading, from the first memory device, a set of second operational parameters, each second operational parameter of the set of second operational parameters corresponding to a respective memory device of the plurality of memory devices. The operations of 520 may be performed in accordance with examples as disclosed herein. In some examples, aspects of the operations of 520 may be performed by an initialization component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a host system, a command to initialize a plurality of memory devices included in a memory system; selecting a first memory device from the plurality of memory devices based at least in part on the command; reading, from a second memory device in a controller separate from the plurality of memory devices, a first operational parameter corresponding to the first memory device; and reading, from the first memory device, a set of second operational parameters, each second operational parameter of the set of second operational parameters corresponding to a respective memory device of the plurality of memory devices.

Aspect 2: The method, apparatus, or non-transitory computer-readable medium of aspect 1 where selecting the first memory device includes operations, features, circuitry, logic, means, or instructions, or any combination thereof for selecting the first memory device using an output of a random number generator.

Aspect 3: The method, apparatus, or non-transitory computer-readable medium of aspect 2 where the random number generator includes one of a true random number generator or a pseudo random number generator.

Aspect 4: The method, apparatus, or non-transitory computer-readable medium of any of aspects 1 through 3, further including operations, features, circuitry, logic, means, or instructions, or any combination thereof for selecting a third memory device from the plurality of memory devices based at least in part on the command.

Aspect 5: The method, apparatus, or non-transitory computer-readable medium of aspect 4, further including operations, features, circuitry, logic, means, or instructions, or any combination thereof for determining whether a first result associated with reading the first operational parameter is a successful result or a failed result and determining whether a second result associated with reading, from the second memory device, a third operational parameter corresponding to the third memory device is the successful result or the failed result, where selecting the first memory device is based at least in part on determining the first result and the second result.

Aspect 6: The method, apparatus, or non-transitory computer-readable medium of aspect 5 where determining whether the first result associated with reading the first operational parameter is the successful result or the failed result includes determining that the first result associated with reading the first operational parameter is the successful result and determining whether the second result associated with reading the third operational parameter is the successful result or the failed result includes determining that the second result associated with reading the third operational parameter is the failed result.

Aspect 7: The method, apparatus, or non-transitory computer-readable medium of any of aspects 5 through 6, further including operations, features, circuitry, logic, means, or instructions, or any combination thereof for storing the first result and the second result in one or more registers.

Aspect 8: The method, apparatus, or non-transitory computer-readable medium of any of aspects 5 through 7, further including operations, features, circuitry, logic, means, or instructions, or any combination thereof for determining, after reading the set of second operational parameters, that the second result includes the failed result; reading, at the controller and from the second memory device, the third operational parameter based at least in part on determining that the second result includes a failed result; and storing the third operational parameter in a latch corresponding to the third memory device.

Aspect 9: The method, apparatus, or non-transitory computer-readable medium of any of aspects 1 through 8 where reading the set of second operational parameters includes operations, features, circuitry, logic, means, or instructions, or any combination thereof for reading, at the controller, the set of second operational parameters.

Aspect 10: The method, apparatus, or non-transitory computer-readable medium of any of aspects 1 through 9 where the controller includes error correcting code circuitry for detecting and correcting errors associated with reading operational parameters.

Aspect 11: The method, apparatus, or non-transitory computer-readable medium of any of aspects 1 through 10, further including operations, features, circuitry, logic, means, or instructions, or any combination thereof for storing each second operational parameter of the set of second operational parameters in a respective latch corresponding to the respective memory device of the plurality of memory devices.

Aspect 12: The method, apparatus, or non-transitory computer-readable medium of any of aspects 1 through 11, further including operations, features, circuitry, logic, means, or instructions, or any combination thereof for selecting the second memory device based at least in part on the command.

Aspect 13: The method, apparatus, or non-transitory computer-readable medium of any of aspects 1 through 12 where the first operational parameter and the set of second operational parameters include voltage parameters.

Aspect 14: The method, apparatus, or non-transitory computer-readable medium of any of aspects 1 through 13 where the first operational parameter and the set of second operational parameters include trims.

Figure 6:
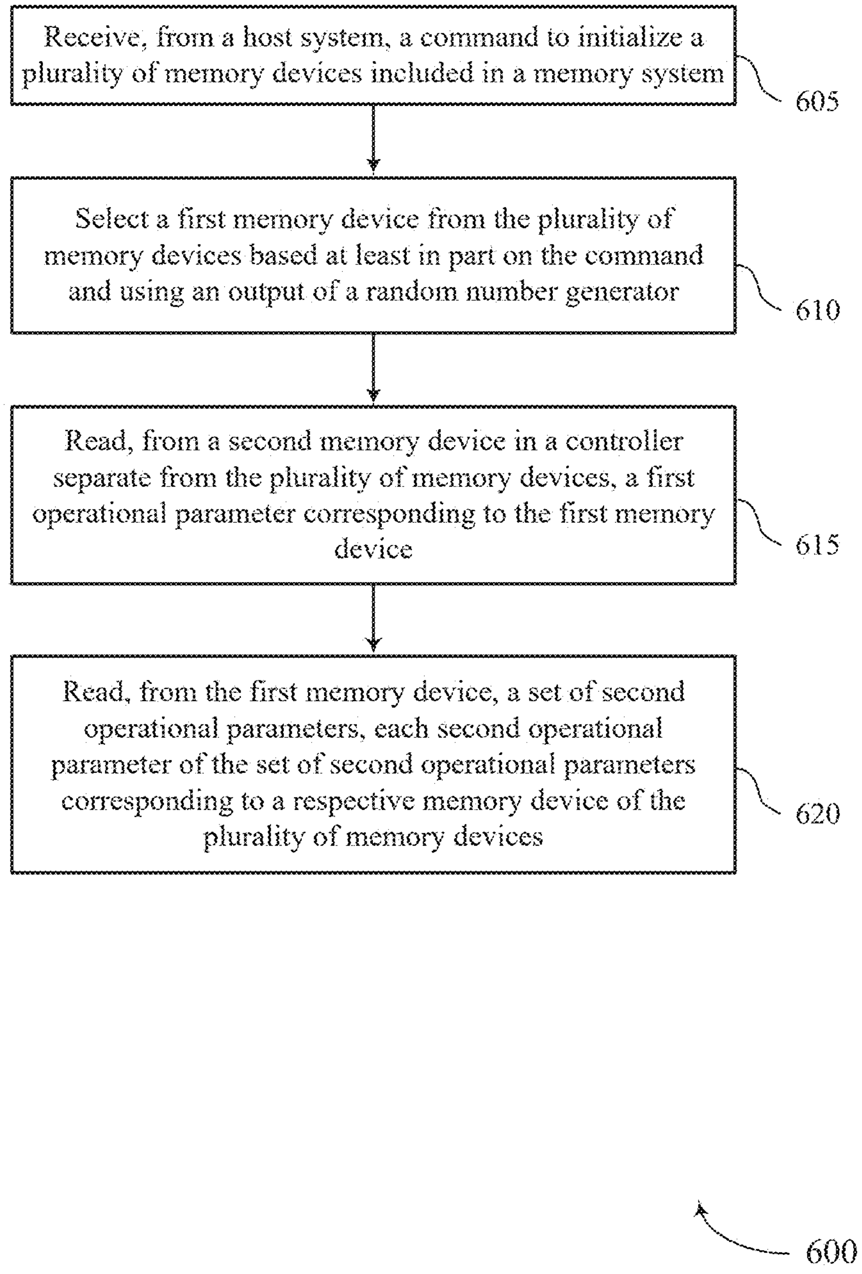

FIG. 6 shows a flowchart illustrating a method 600 that supports distributed power up for a memory system in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include receiving, from a host system, a command to initialize a plurality of memory devices included in a memory system. The operations of 605 may be performed in accordance with examples as disclosed herein. In some examples, aspects of the operations of 605 may be performed by a command component 425 as described with reference to FIG. 4.

At 610, the method may include selecting a first memory device from the plurality of memory devices based at least in part on the command and using an output of a random number generator. The operations of 610 may be performed in accordance with examples as disclosed herein. In some examples, aspects of the operations of 610 may be performed by a selection component 430 as described with reference to FIG. 4.

At 615, the method may include reading, from a second memory device in a controller separate from the plurality of memory devices, a first operational parameter corresponding to the first memory device. The operations of 615 may be performed in accordance with examples as disclosed herein. In some examples, aspects of the operations of 615 may be performed by an initialization component 435 as described with reference to FIG. 4.

At 625, the method may include reading, from the first memory device, a set of second operational parameters, each second operational parameter of the set of second operational parameters corresponding to a respective memory device of the plurality of memory devices. The operations of 625 may be performed in accordance with examples as disclosed herein. In some examples, aspects of the operations of 625 may be performed by an initialization component 435 as described with reference to FIG. 4.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

a set of memory devices; and processing circuitry coupled with the set of memory devices and configured to cause the memory system to:

receive a command to initialize the set of memory devices included in the memory system;

select, in accordance with the command, a first memory device from the set of memory devices in accordance with a randomly selected number;

perform a first initialization procedure corresponding to the command on a first subset of the set of memory devices according to a first operational parameter corresponding to the first memory device, the first subset of the set of memory devices comprising the first memory device; and store, at one or more registers, a first result associated with performance of the first initialization procedure, wherein the first result comprises a successful result or a failed result.

2. The memory system of claim 1, wherein the processing circuitry is further configured to cause the memory system to:

select, in accordance with the first result comprising the failed result, a second memory device from the set of memory devices in accordance with a second randomly selected number; and perform a second initialization procedure corresponding to the command on a second subset of the set of memory devices according to a set of second operational parameters, according to a second operational parameter corresponding to the second memory device, or both, the second subset of the set of memory devices comprising the second memory device.

3. The memory system of claim 2, wherein the processing circuitry is further configured to cause the memory system to:

store, at the one or more registers, a second result associated with performance of the second initialization procedure, wherein the second result comprises the successful result or the failed result; and perform, in accordance with the second result comprising the successful result, a third initialization procedure, corresponding to the command, on a third subset of the set of memory devices according to a set of third operational parameters, wherein each third operational parameter of the set of third operational parameters corresponds to a respective memory device of the third subset of the set of memory devices, the third subset of the set of memory devices different than the second subset of the set of memory devices.

4. The memory system of claim 1, wherein the processing circuitry is further configured to cause the memory system to:

perform, in accordance with the first result comprising the successful result, a second initialization procedure, corresponding to the command, on a second subset of the set of memory devices according to a set of second operational parameters, wherein each second operational parameter of the set of second operational parameters corresponds to a respective memory device of the second subset of the set of memory devices, the second subset of the set of memory devices different than the first subset of the set of memory devices.

5. The memory system of claim 1, wherein the processing circuitry is further configured to cause the memory system to:

read, from a second memory device in a controller separate from the set of memory devices, the first operational parameter corresponding to the first memory device, wherein determining the first result corresponds to whether reading the first operational parameter is successful.

6. The memory system of claim 5, wherein the processing circuitry is further configured to cause the memory system to:

read, from the second memory device, the first operational parameter in accordance with failing to read the first operational parameter, wherein the first result comprises the failed result in accordance with failing to read the first operational parameter; and store the first operational parameter in a latch corresponding to the first memory device.

7. The memory system of claim 6, wherein the controller comprises error correcting code circuitry for detecting and correcting errors associated with reading operational parameters, and wherein the processing circuitry is further configured to cause the memory system to:

perform, at the controller, an error correction operation in accordance with reading the first operational parameter; and perform a second initialization procedure corresponding to the command on the first subset of the set of memory devices according to the first operational parameter corresponding to the first memory device.

8. The memory system of claim 6, wherein determining whether the first result comprises the failed result occurs after reading, from the first memory device, a second set of second operational parameters.

9. The memory system of claim 1, wherein the first operational parameter comprises a voltage parameter, a trim set, or any combination thereof.

10. A memory system, comprising:

a set of memory devices; and processing circuitry coupled with the set of memory devices and configured to cause the memory system to:

receive a command to initialize the set of memory devices included in the memory system;

select, in accordance with the command, a first memory device from the set of memory devices in accordance with a randomly selected number;

perform a first initialization procedure, corresponding to the command, on a first subset of the set of memory devices according to a first operational parameter that corresponds to the first memory device, wherein the first subset of the set of memory devices comprises the first memory device; and perform, in accordance with performing the first initialization procedure, a second initialization procedure, corresponding to the command, on a second subset of the set of memory devices according to a set of second operational parameters, wherein each second operational parameter of the set of second operational parameters corresponds to a respective memory device of the second subset of the set of memory devices, the second subset of the set of memory devices different than the first subset of the set of memory devices.

11. The memory system of claim 10, wherein the processing circuitry is further configured to cause the memory system to:

read, from a second memory device in a controller separate from the set of memory devices, the first operational parameter corresponding to the first memory device; and read, from the first memory device, the set of second operational parameters.

12. The memory system of claim 10, wherein the randomly selected number comprises an output of a random number generator, wherein the random number generator comprises one of a true random number generator or a pseudo random number generator.

13. The memory system of claim 10, wherein the memory system comprises a controller, separate from the set of memory devices, that comprises error correcting code circuitry for detecting and correcting errors associated with reading operational parameters and wherein the processing circuitry is further configured to cause the memory system to:

detect, at the controller, one or more errors associated with the first operational parameter, one or more operational parameters of the set of second operational parameters, or any combination thereof; and determine whether the first initialization procedure is successful for one or more memory devices of the first subset of the set of memory devices, the second subset of the set of memory devices, or any combination thereof in accordance with detecting the one or more errors.

14. The memory system of claim 10, wherein the processing circuitry is further configured to cause the memory system to:

store each second operational parameter of the set of second operational parameters in a respective latch corresponding to the respective memory device of the second subset of the set of memory devices.

15. The memory system of claim 11, wherein the first operational parameter and the set of second operational parameters comprise voltage parameters.

16. The memory system of claim 10, wherein the first operational parameter and the set of second operational parameters comprise trim sets.

17. The memory system of claim 10, wherein the processing circuitry is further configured to cause the memory system to:

select a fourth memory device from the set of memory devices in accordance with the command;

determine whether a first result associated with reading the first operational parameter comprises a successful result or a failed result; and determine whether a second result associated with reading a third operational parameter corresponding to the fourth memory device is the successful result or the failed result, wherein selecting the first memory device is in accordance with determining the first result and the second result.

18. The memory system of claim 17, wherein the processing circuitry is further configured to cause the memory system to:

store the first result and the second result in one or more registers.

19. The memory system of claim 17, wherein the processing circuitry is further configured to cause the memory system to:

determine, after reading the set of second operational parameters, whether the second result comprises the failed result;

read, at a second memory device in a controller separate from the set of memory devices, the third operational parameter in accordance with determining whether the second result comprises the failed result; and store the third operational parameter in a latch corresponding to the fourth memory device.

20. A non-transitory computer-readable medium storing code comprising instructions which, when executed by processing circuitry of a memory system, cause the memory system to:

receive a command to initialize a set of memory devices included in the memory system;

select, in accordance with the command, a first memory device from the set of memory devices in accordance with a randomly selected number;

perform a first initialization procedure corresponding to the command on a first subset of the set of memory devices according to a first operational parameter corresponding to the first memory device, the first subset of the set of memory devices comprising the first memory device; and store a first result associated with performance of the first initialization procedure at one or more registries, wherein the first result is a successful result or a failed result.

* * * * *